United States Patent
Tian et al.

(10) Patent No.: US 9,967,254 B2
(45) Date of Patent: May 8, 2018

(54) DYNAMICALLY SELECTING A DHCP SERVER FOR A CLIENT TERMINAL

(75) Inventors: Yuan Tian, Beijing (CN); Hongqiang Yu, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 265 days.

(21) Appl. No.: 14/352,058

(22) PCT Filed: Aug. 24, 2012

(86) PCT No.: PCT/CN2012/080542
§ 371 (c)(1),
(2), (4) Date: Apr. 15, 2014

(87) PCT Pub. No.: WO2013/086870
PCT Pub. Date: Jun. 20, 2013

(65) Prior Publication Data
US 2014/0282920 A1 Sep. 18, 2014

(30) Foreign Application Priority Data
Dec. 15, 2011 (CN) .......................... 2011 1 0422485

(51) Int. Cl.
*H04L 29/06* (2006.01)
*H04L 29/12* (2006.01)
(52) U.S. Cl.
CPC .......... *H04L 63/10* (2013.01); *H04L 61/2015* (2013.01); *H04L 63/0869* (2013.01)
(58) Field of Classification Search
CPC .. H04L 63/10; H04L 61/2015; H04L 63/0869
(Continued)

(56) References Cited

U.S. PATENT DOCUMENTS 6,792,474 B1 9/2004 Hopprich et al.
7,509,394 B2 * 3/2009 Kim .............................. 709/217
(Continued)

FOREIGN PATENT DOCUMENTS

CN 1744612 3/2006
CN 1953464 4/2007
(Continued)

OTHER PUBLICATIONS

International Search Report and Written Opinion dated Dec. 13, 2012 issued on PCT Patent Application No. PCT/CN2012/080542 dated Aug. 24, 2012, The State Intellectual Property Office, the P.R. China.

*Primary Examiner* — Hadi S Armouche
*Assistant Examiner* — Sakinah White Taylor
(74) *Attorney, Agent, or Firm* — Hewlett Packard Enterprise Patent Department

(57) ABSTRACT

Dynamically selecting a DHCP server for a DHCP client terminal device may include triggering, by a network device, an authentication performed by an authentication server on a DHCP client terminal device user when receiving a DHCP packet for requesting a configuration parameter sent from a DHCP client terminal device, receiving, by the network device, an identity of a DHCP server designated by the authentication server for the DHCP client terminal device user when the DHCP client terminal device user passes the authentication, and establishing an entry for user information of the DHCP client terminal device user and the identity of the designated DHCP server, and matching, by the network device, the user information carried in a packet with established entries when receiving the packet subsequently sent from the DHCP client terminal device, and forwarding the packet using the identity of the DHCP server in the entry matching the user information.

13 Claims, 3 Drawing Sheets

(58) Field of Classification Search
USPC .......................................... 726/4, 27
See application file for complete search history.

(56) References Cited

U.S. PATENT DOCUMENTS

| | | | | |
|---|---|---|---|---|
| 2004/0208151 | A1* | 10/2004 | Haverinen et al. ............ | 370/338 |
| 2008/0134315 | A1* | 6/2008 | Tamura et al. ................. | 726/12 |
| 2008/0282325 | A1* | 11/2008 | Oyama ............... | H04L 61/2015 726/4 |
| 2009/0094381 | A1* | 4/2009 | King ..................... | G06F 15/173 709/240 |
| 2009/0193103 | A1* | 7/2009 | Small et al. ................. | 709/221 |
| 2009/0225761 | A1* | 9/2009 | Sarikaya et al. .............. | 370/400 |
| 2010/0017597 | A1* | 1/2010 | Chandwani ......... | H04L 29/1232 713/156 |
| 2010/0115113 | A1* | 5/2010 | Short ...................... | H04L 63/08 709/228 |
| 2010/0275248 | A1* | 10/2010 | Li ..................... | 726/4 |
| 2010/0332615 | A1* | 12/2010 | Short ...................... | H04L 63/08 709/217 |
| 2013/0132576 | A1* | 5/2013 | Haba et al. .................. | 709/225 |

FOREIGN PATENT DOCUMENTS

| | | |
|---|---|---|
| CN | 101047673 | 10/2007 |
| CN | 101141253 | 3/2008 |
| CN | 101184099 | 5/2008 |
| CN | 101674139 | 3/2010 |
| CN | 101690132 | 3/2010 |
| CN | 102497378 | 6/2012 |

* cited by examiner

DYNAMICALLY SELECTING A DHCP SERVER FOR A CLIENT TERMINAL

CROSS-REFERENCE TO RELATED APPLICATION

The present application is a 371 application of International Application No. PCT/CN2012/080542 filed on Aug. 24, 2012 and entitled "Method and Device for Dynamically Selecting a DHCP Server for a Client Terminal," which claims benefit of Chinese Patent App. No. CN 201110422485.X filed on Dec. 15, 2011.

BACKGROUND

Dynamic Host Configuration Protocol (DHCP) is used for dynamically allocating network configuration parameters, such as IP addresses, to network devices. DHCP adopts a client terminal device/server communication mode. That is, a DHCP client terminal device sends a configuration request to a DHCP server, and the DHCP server returns configuration information, such as an IP address, requested by the DHCP client terminal device, to implement the dynamic configuration of the configuration information.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

A method in which a DHCP client terminal device dynamically obtains a configuration parameter is described hereafter, in which a method of obtaining an IP address is taken as an example. The method for dynamically obtaining other configuration parameters is similar to that for dynamically obtaining the IP address.

Figure 1:
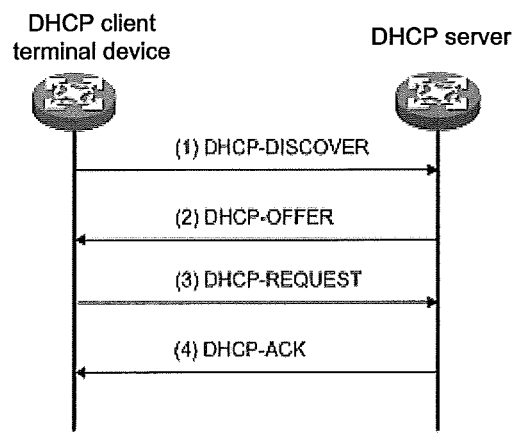
FIG. 1 is a flow chart illustrating a method for a DHCP client terminal device dynamically obtaining an IP address.

Referring to FIG. 1, there is shown a flow chart that illustrates a method for a DHCP client terminal device dynamically obtaining an IP address. The method is mainly implemented through four stages:

DHCP-DISCOVER: A stage in which the DHCP client terminal device finds DHCP servers. The DHCP client terminal device finds the DHCP servers by broadcasting DHCP-DISCOVER packets.

DHCP-OFFER: A stage in which the DHCP servers provide IP addresses. After receiving the DHCP-DISCOVER packets from the DHCP client terminal device, each DHCP server selects an IP address according to a priority for allocating IP addresses, and sends the IP address and other parameters carried in a DHCP-OFFER packet to the DHCP client terminal device.

DHCP-REQUEST: A stage in which the DHCP client terminal device selects an IP address. If multiple DHCP servers send the DHCP-OFFER packets to the DHCP client terminal device, the DHCP client terminal device selectively receives one of the DHCP-OFFER packets according to a protocol, for example, the first received DHCP-OFFER packet, and broadcasts DHCP-REQUEST packets, each of which includes the IP address carried in the DHCP-OFFER packet selectively received by the DHCP client terminal device.

DHCP-ACK: A stage in which the DHCP server makes an acknowledgement of allocating the IP address. After receiving the DHCP-REQUEST packet sent from the DHCP client terminal device, the DHCP server (i.e., the DHCP server sending the DHCP-OFFER packet selectively received by the DHCP client terminal device) selected by the DHCP client terminal device proceeds as follows: send a DHCP-ACK packet to the DHCP client terminal device if a determination is made to allocate the IP address to the DHCP client terminal device; otherwise, return a DHCP-NAK packet, indicating that the IP address cannot be allocated to the DHCP client terminal device.

Thus, the method through which the DHCP client terminal device dynamically obtains the IP address may be implemented through the above four stages.

It can be seen from the flow shown in FIG. 1 that the DHCP client terminal device sends the packet in a broadcast mode in the process in which the DHCP client terminal device dynamically obtains the IP address. This mode for sending the packet indicates that the flow shown in FIG. 1 applies to the situation in which the DHCP client terminal device and the DHCP server are located in the same subnetwork. Thus, each network segment needs to be configured with a DHCP server for dynamic host configuration, which is obviously uneconomical. A DHCP relay function is introduced to solve this problem.

Figure 2:
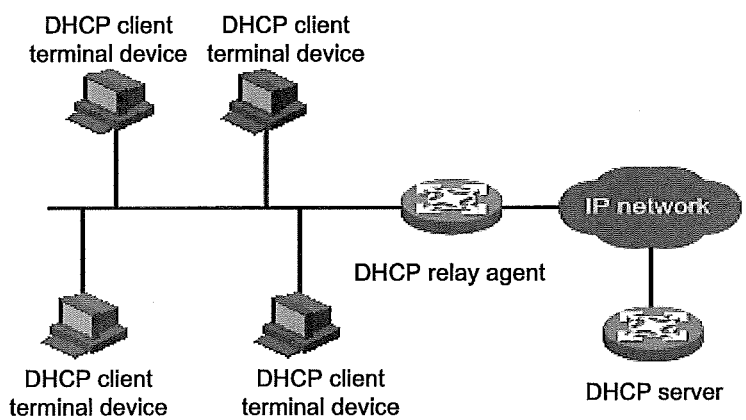
FIG. 2 is a network application diagram of a DHCP relay agent.

Actually, the DHCP relay function means that the DHCP client terminal device communicates with the DHCP servers of other network segments using a network device with the DHCP relay function (called the DHCP relay agent for short. The DHCP relay agent may be suitable with a device with a DHCP relay function, for example a network device such as a switch, router with this functionality. In this way the dynamic configuration is eventually implemented. Thus, DHCP client terminal devices of multiple network segments may use the same DHCP server, as shown in FIG. 2, which saves on costs and is convenient for central management. The methods used by the DHCP client terminal device and DHCP server are basically the same as those used by the DHCP client terminal device and DHCP server without the DHCP relay agent in the process of completing the dynamic configuration of the DHCP client terminal device through the DHCP relay agent, such as in the process of dynamically obtaining the IP address. The present disclosure is described hereafter taking the method for the DHCP client terminal device dynamically obtaining the IP address, for example, and the method for dynamically obtaining other configuration parameters are similar to that for dynamically obtaining the IP address.

Figure 3:
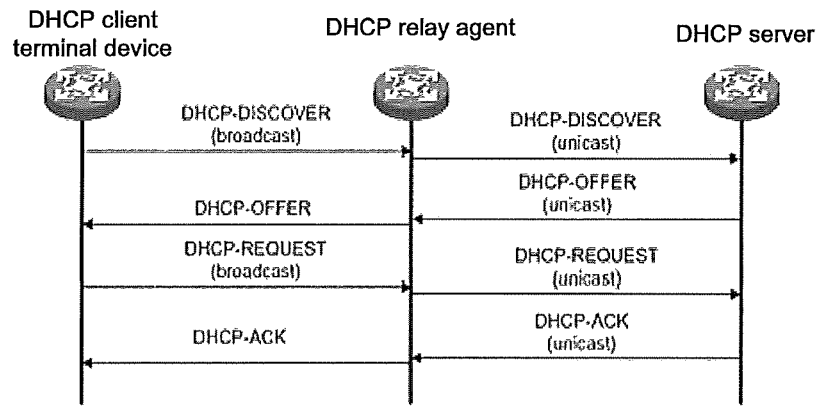
FIG. 3 is a flow chart illustrating a method for dynamically obtaining an IP address using a DHCP relay.

Referring to FIG. 3, there is shown a flow chart illustrating a method for dynamically obtaining an IP address using a DHCP relay. As shown in FIG. 3, the method includes establishing a DHCP server group corresponding to a user side interface on the DHCP relay agent and connected with the DHCP client terminal device. After receiving the DHCP-DISCOVER packets broadcast by the DHCP client terminal device through the user side interface, the DHCP relay agent fills each gateway IP address (giaddr) field of the received DHCP-DISCOVER packets with the IP address of the DHCP relay agent, and forwards the DHCP-DISCOVER packets to all of the DHCP servers in the DHCP server group corresponding to the user side interface. After receiving the DHCP-DISCOVER packets forwarded by the DHCP relay agent, the DHCP servers allocate the IP addresses for the DHCP client terminal device according to the giaddr fields, and forward the allocated IP addresses to the DHCP client terminal device through the DHCP relay agent. The DHCP client terminal device selects one of the IP addresses, such as the first received IP address, and broadcasts DHCP-REQUEST packets including the selected IP address. When receiving the DHCP-REQUEST packets broadcast by the DHCP client terminal device through its user side interface, the DHCP relay agent fills each giaddr filed of the received DHCP-REQUEST packets with the IP address of the DHCP relay agent, and forwards the DHCP-REQUEST packets to all of the DHCP servers in the DHCP server group corresponding to the user side interface. The receiving servers execute the above DHCP-ACK. At this point, the dynamic configuration of the DHCP client terminal device is finished.

Further, the DHCP relay agent supports a function to identify a DHCP client terminal device (e.g. a function of Option 82 which records location information of the DHCP client terminal device). On the basis of this, the DHCP client terminal device may be located with Option 82, so that the security and charging control may be performed on the DHCP client terminal device.

It can be seen from the method of FIG. 3 that after establishing the DHCP server group corresponding to the user side interface on the DHCP relay agent and connecting with the DHCP client terminal device, the DHCP relay agent forwards the DHCP-DISCOVER packets to all of the DHCP servers in the DHCP server group corresponding to the user side interface when receiving the DHCP-DISCOVER packets broadcast by the DHCP client terminal device through the user side interface, and all of the DHCP servers send the DHCP-OFFER packets as acknowledgements to the DHCP client terminal device. Actually, the DHCP client terminal device selects one acknowledgement, such as the first received acknowledgement. Thus, on the one hand, most IP addresses allocated to the DHCP client terminal device by the DHCP servers are unavailable. This wastes the resources of the DHCP servers. On the other hand, it cannot be guaranteed that the DHCP client terminal device may obtain the configuration parameter from the same DHCP server each time, resulting in frequent change of the configuration parameter, which affects the network communication.

Examples of the present disclosure are further described in detail hereinafter with reference to the accompanying drawings.

In a method provided by the present disclosure, an authentication server instructs a network device with a DHCP relay function to fixedly forward a DHCP packet sent from a DHCP client terminal device to a same DHCP server. The network device may be a gateway device or any other network device. The present disclosure does not make a limitation on the network device.

Figure 4:
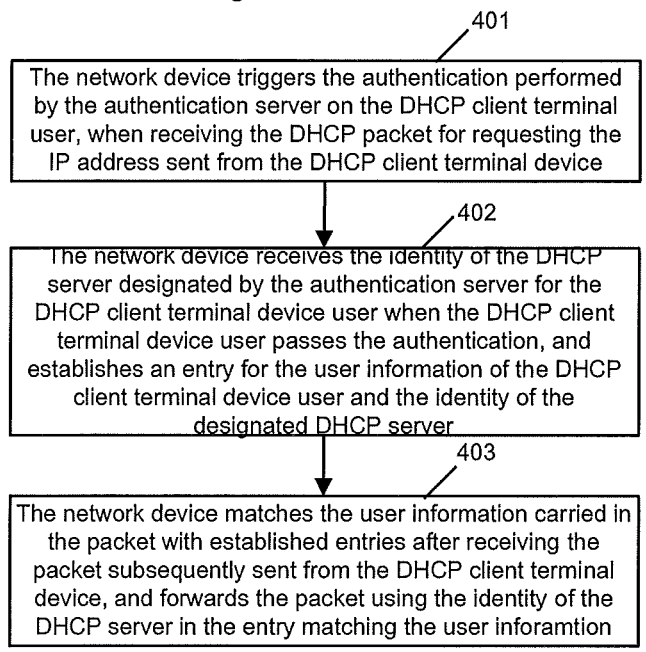
FIG. 4 is a flow chart illustrating a method in accordance with an example of the present disclosure.

An example of a method provided by the present disclosure is described with respect to FIG. 4.

Referring to FIG. 4, there is shown a flow chart illustrating a method in accordance with an example of the present disclosure. As shown in FIG. 4, the method includes the following blocks.

Block 401: When receiving a DHCP packet for requesting a configuration parameter sent from the DHCP client terminal device, the network device with the DHCP relay function triggers the authentication performed by an authentication server on the DHCP client terminal device. The configuration parameter may be an IP address, a Domain Name System (DNS), a gateway or a domain, etc. This example is described hereafter with the configuration parameter taken as the IP address and the DHCP packet for requesting the configuration parameter taken as the DHCP packet for requesting the IP address.

In block 401, the DHCP packet may be a packet sent by the DHCP client terminal device for the first time when requesting the IP address, i.e., the DHCP-DISCOVER packet. Certainly, as an extension of this disclosure, the DHCP packet may be the DHCP-REQUEST packet. The present disclosure does not make a limitation on the DHCP packet.

Block 402: The network device receives an identity of the DHCP server designated by the authentication server when the DHCP client terminal device passes the authentication, and establishes an entry for user information of the DHCP client terminal device user and the identity of the designated DHCP server.

The identity of the DHCP server may be the IP address of the DHCP server, etc. The present disclosure does not make a limitation on the identity of the DHCP server.

Further, in block 402, the method for the authentication server designating the DHCP server for the DHCP client terminal device may include the following.

The authentication server identifies a privilege of the DHCP client terminal device user, searches for the DHCP servers corresponding to the privilege of the DHCP client terminal device user in preset corresponding relationships between user privileges and DHCP servers, and designates one of the found DHCP servers for the DHCP client terminal device. The method for designating one of the DHCP servers for the DHCP client terminal device user includes: designating any one of the DHCP servers for the DHCP client terminal device user if the number of the found DHCP servers is larger than one; or designating the DHCP server with the highest priority in the found DHCP servers; and designating the found DHCP server for the DHCP client terminal device user if one DHCP server is found.

That is, in the present disclosure, the authentication server designates the DHCP server for the DHCP client terminal device user according to the privilege of the DHCP client terminal device user, which insures that the DHCP client terminal device eventually communicates with the appropriate DHCP server.

Figure 5:
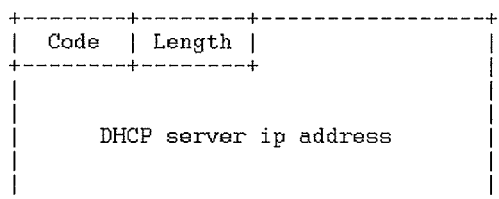
FIG. 5 is a diagram illustrating an identity of a DHCP server encapsulated in option 221.

It should be noted that the above authentication server may be a server supporting a Remote Authentication Dial-In User Service (RADIUS), called the RADIUS server for short. On the basis of this, in the above block 402, the authentication server may authenticate the DHCP client terminal device based on the existing RADIUS authentication. Accordingly, in block 402, the authentication server may encapsulate the identity of the designated DHCP server in an unused option in the Request for Comments (RFC) of the RADIUS, and sends the identity of the designated DHCP server to the network device. The unused option in the RFC of the RADIUS is option 221. FIG. 5 is a diagram illustrating the IP address of the designated DHCP server encapsulated in option 221, in an example in which the identity of the designated DHCP server is the IP address of the designated DHCP server.

Block 403: When receiving packets subsequently sent from the DHCP client terminal device, the network device matches the user information carried in the packet with established entries after subsequently receiving the packet sent from the DHCP client terminal device, and forwards the packet using the identity of the DHCP server in an entry matching the user information.

For instance, after receiving the request packet, such as a renewal packet subsequently sent from the DHCP client terminal device, the network device directly matches the user information carried in the packet with the established entries, and forwards the received packet using the identity of the DHCP server included in the entry matching the user information, i.e., forwards the packet to the DHCP server corresponding to the identity of the DHCP server included in the entry matching the user information. The established entries include an entry established for the user information of the DHCP client terminal device user and the identity of the designated DHCP server, and entries established for user information of other DHCP client terminal device users and identities of DHCP servers designated for the DHCP client terminal device users.

At this point, the flow shown in FIG. 4 is finished.

It can be seen from the flow shown in FIG. 4 that after receiving the packet sent from the DHCP client terminal device, the network device matches the user information carried in the packet with the established entries, directly forwards the packet using the identity of the DHCP server in the entry matching the user information, i.e., forwards the packet to the DHCP server corresponding to the identity of the DHCP server in the entry matching the user information, which ensures that the packet of the same client terminal device may be processed with the same DHCP server, In the above descriptions, the user information mainly includes Media Access Control (MAC) addresses of the DHCP client terminal device user and/or interface used by the DHCP client terminal device for accessing the network device, etc.

An example of a method of the present disclosure is described above. An example of a device of the present disclosure is described hereafter.

First, a description of a network device for dynamically selecting a DHCP server for the DHCP client terminal device is provided. The network device has a DHCP relay function, specifically shown in FIG. 6.

Figure 6:
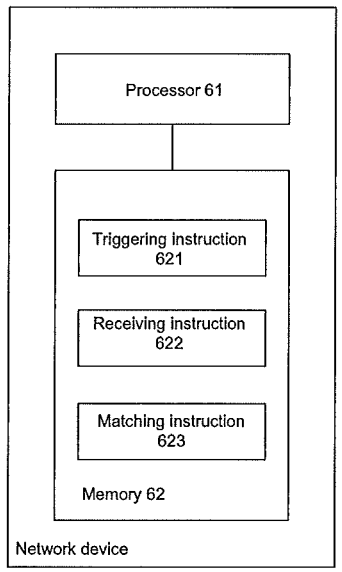
FIG. 6 is a schematic diagram illustrating structure of a network device in accordance with an example of the present disclosure.

Referring to FIG. 6, there is shown a schematic diagram illustrating the structure of a network device in accordance with an example of the present disclosure. As shown in FIG. 6, the network device includes a processor 61 and a memory 62.

The memory 62 is a computer readable storage medium storing computer readable instructions. The processor 61 executes the computer readable instructions stored in the memory 62. The memory 62 includes triggering instruction 621, receiving instruction 622, and matching instruction 623.

The triggering instruction 621 is executed to trigger the authentication performed by an authentication server on the DHCP client terminal device when receiving a DHCP packet for requesting a configuration parameter sent from the DHCP client terminal device. The configuration parameter may be an IP address, DNS, gateway and domain, etc. This example is described with the configuration parameter taken as the IP address and the DHCP packet for requesting the configuration parameter taken as the DHCP packet for requesting the IP address.

The receiving instruction 622 is executed to receive an identity of a DHCP server designated by the authentication server for the DHCP client terminal device when the DHCP client terminal device passes the authentication, and establish an entry for user information of the DHCP client terminal device user and the identity of the designated DHCP server.

The matching instruction 623 is executed to match the user information carried in the packet with established entries after receiving the packet subsequently sent from the DHCP client terminal device, and forward the packet using the identity of the DHCP server in the entry matching the user information.

Figure 7:
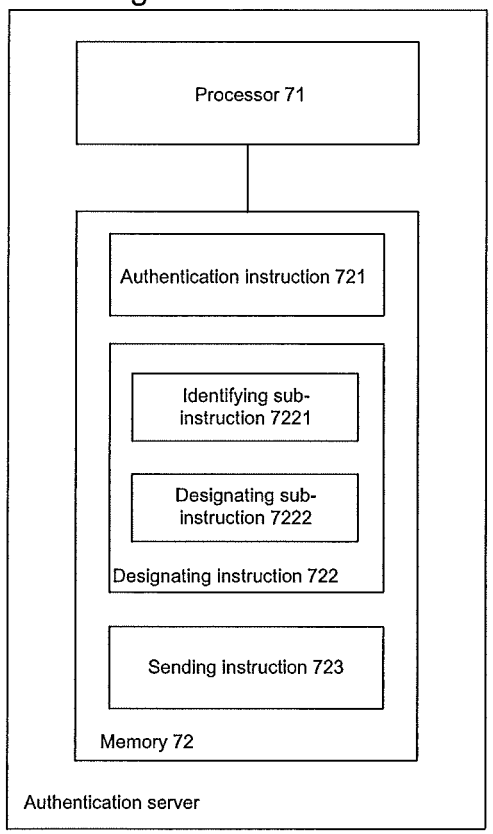
FIG. 7 is a schematic diagram illustrating structure of an authentication server in accordance with an example of the present disclosure.

Further, a description of an authentication server for dynamically selecting a DHCP server for a DHCP client terminal device is provided, as shown in FIG. 7.

Referring to FIG. 7, there is shown a schematic diagram illustrating the structure of an authentication server in accordance with an example of the present disclosure. As shown in FIG. 7, the authentication server includes: a processor 71 and a memory 72.

The memory 72 is a computer readable storage medium storing computer readable instructions. The processor 71 executes the computer readable instructions stored in the memory 72. The memory 72 includes authentication instruction 721, designating instruction 722 and sending instruction 723. The designating instruction 722 further includes identifying sub-instruction 7221 and designating sub-instruction 7222.

The authentication instruction 721 is executed to authenticate the DHCP client terminal device user under the trigger of the network device with the DHCP relay function. The authentication instruction 721 is triggered to authenticate the DHCP client terminal device user when the network device receives a DHCP packet for requesting a configuration parameter sent from the DHCP client terminal device. The configuration parameter may be an IP address, DNS, gateway or domain, etc. The present disclosure is described hereafter with the configuration parameter taken as the IP address, and the DHCP packet for requesting the configuration parameter taken as the DHCP packet for requesting the IP address.

The designating instruction 722 is executed to designate the DHCP server for the DHCP client terminal device when the DHCP client terminal device user passes the authentication.

The sending instruction 723 is executed to notify the network device of the identity of the designated DHCP server, so that the network device establishes an entry for the user information of the DHCP client terminal device user and the identity of the designated DHCP server, and matches the user information carried in the packet with established entries when receiving the packet subsequently sent from the DHCP client terminal device, and forwards the packet using the identity of the DHCP server in the entry matching the user information.

The DHCP packet is the DHCP-DISCOVER packet.

The identifying sub-instruction 7221 is executed to identify a privilege of the DHCP client terminal device user, and to search for the DHCP servers corresponding to the identified privilege in preset corresponding relationships between user privileges and DHCP servers.

The designating sub-instruction 7222 is executed to designate one of the found DHCP servers for the DHCP client terminal device user.

In this disclosure, the authentication server supports a Remote Authentication Dial-In User Service (RADIUS). When the sending instruction 723 is executed, the identity of the designated DHCP server is encapsulated in an unused option in the RADIUS RFC and sent to the network device.

Further disclosed herein is a system for dynamically selecting a DHCP server for a DHCP client terminal device. The system includes: a DHCP client terminal device, a network device with a DHCP relay function, and an authentication server.

The DHCP client terminal device is to send a DHCP packet for requesting a configuration parameter to the network device, and to subsequently send a packet to the network device. The configuration parameter may be an IP address, a Domain Name System (DNS), a gateway or a domain, etc. This example is described with the configuration parameter taken as the IP address and the DHCP packet for requesting the configuration parameter taken as the DHCP packet for requesting the IP address.

The network device is to trigger the authentication performed by the authentication server on the DHCP client terminal device user after receiving the DHCP packet for requesting the IP address sent from the DHCP client terminal device, to receive an identity of the DHCP server designated by the authentication server for the DHCP client terminal device user, to establish an entry for the user information of the DHCP client terminal device user and the identity of the designated DHCP server, to match the user information carried in the packet with established entries after receiving the packet subsequently sent from the DHCP client terminal device, and to forward the packet using the identity of the DHCP server in the entry matching the user information.

The authentication server is to authenticate the DHCP client terminal device user under the trigger of the network device, and designate the DHCP server for the DHCP client terminal device user if the DHCP client terminal device user passes the authentication, and to notify the network device of the identity of the designated DHCP server.

In a specific application, the authentication server is further to identify the privilege of the DHCP client terminal device user, search for the DHCP servers corresponding to the identified privilege in preset corresponding relationships between user privileges and DHCP servers, and designate one of the found DHCP servers for the DHCP client terminal device user.

In one example, the DHCP packet is the DHCP-DISCOVER packet.

In a specific application, the authentication server is a RADIUS server, configured to encapsulate the identity of the designated DHCP server in an unused option in the RADIUS RFC, and is to send the identity of the designated DHCP server to the network device.

It can be seen from the above examples that in this disclosure, the authentication server designates a DHCP server for the DHCP client terminal device user when the DHCP client terminal device user applies for the IP address and notifies the network device with the DHCP relay function of the identity of the designated DHCP server. Thus, the network device establishes an entry for the user information of the DHCP client terminal device user and the identity of the DHCP server designated for the DHCP client terminal device (these entries may for example be stored in a memory or non-transitory computer readable storage medium of the network device). The network device matches the user information carried in the received packet with the established entries (e.g. those stored in memory), and forwards the packet using the identity of the DHCP server in the entry matching the user information. Thus, the DHCP client terminal device may fixedly communicate with the same DHCP server each time, which saves the resources of the server.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for dynamically selecting a Dynamic Host Configuration Protocol (DHCP) server for a DHCP client terminal device, comprising:

triggering, by a network device with a DHCP relay function, an authentication performed by an authentication server on the DHCP client terminal device user when receiving a DHCP packet for requesting a configuration parameter sent from the DHCP client terminal device, wherein the authentication server is a Remote Authentication Dial-In User Service (RADIUS) server;

receiving, by the network device, an identity of a DHCP server, among a plurality of DHCP servers, designated by the RADIUS server for the DHCP client terminal device user when the DHCP client terminal device user passes the authentication by obtaining, by the network device, the identity of the DHCP server encapsulated in an option from an option of Request for Comments (RFC) of a RADIUS sent from the RADIUS server; and establishing an entry for user information of the DHCP client terminal device user and the identity of the DHCP server designated for that DHCP client terminal device to reduce resource utilization of the DHCP server, wherein the RADIUS server is to designate the DHCP server for the DHCP client terminal device by identifying, by the RADIUS server, a privilege of the DHCP client terminal device user, searching for DHCP servers, from the plurality of DHCP servers, corresponding to the identified privilege in preset corresponding relationships between user privileges and DHCP servers, and designating one of the found DHCP servers for the DHCP client terminal device user.

2. The method of claim 1, wherein the DHCP packet is a DHCP-DISCOVER packet; and the method further comprises:

matching, by the network device, the user information carried in a packet with established entries when receiving the packet subsequently sent from the DHCP client terminal device, and forwarding the packet using the identity of the DHCP server in the entry matching the user information.

3. The method of claim 1, wherein the configuration parameter comprises: an IP address, a Domain Name System, a gateway, and a domain.

4. The method of claim 1, wherein the DHCP packet is a DHCP-DISCOVER packet, and the method further comprises:
receiving, by the network device, a plurality of DHCP-DISCOVER packets including the DHCP-DISCOVER packet broadcast by the DHCP client terminal device through a user side interface;
filling, by the network device, each gateway Internet Protocol (IP) address field of the received DHCP-DISCOVER packets with an IP address of the network device; and
forwarding, by the network device, the DHCP-DISCOVER packets to the plurality of DHCP servers including the DHCP server in a DHCP server group corresponding to the user side interface.

5. The method of claim 1, further comprising:
instructing, by the authentication server, the network device to fixedly forward the DHCP packet sent from the DHCP client terminal device to a same DHCP server.

6. The method of claim 1, further comprising:
designating the DHCP server with a highest priority amongst the plurality of DHCP servers.

7. A network device for dynamically selecting a Dynamic Host Configuration Protocol (DHCP) server for a DHCP client terminal device comprising: a processor and a memory; wherein
the processor communicates with the memory and executes machine readable instructions stored in the memory; and
the memory comprises:
a triggering instruction to be executed to receive a DHCP packet for requesting a configuration parameter sent from the DHCP client terminal device and to trigger an authentication performed by an authentication server on a DHCP client terminal device user, wherein the authentication server is a Remote Authentication Dial-In User Service (RADIUS) server;
a receiving instruction to be executed
to receive an identity of a DHCP server, among a plurality of DHCP servers, designated by the RADIUS server for the DHCP client terminal user when the DHCP client terminal device user passes the authentication by obtaining the identity of the DHCP server encapsulated in an option from an option of Request for Comments (RFC) of a RADIUS sent from the RADIUS server, and
to establish an entry for user information of the DHCP client terminal user and the identity of the DHCP server designated for that DHCP client terminal device to reduce resource utilization of the DHCP server, wherein
the RADIUS server is to designate the DHCP server for the DHCP client terminal device by identifying, by the RADIUS server, a privilege of the DHCP client terminal device user, searching for DHCP servers, from the plurality of DHCP servers, corresponding to the identified privilege in preset corresponding relationships between user privileges and DHCP servers, and designating one of the found DHCP servers for the DHCP client terminal device user.

8. The network device of claim 7, wherein the configuration parameter comprises: an IP address, a Domain Name System, a gateway, and a domain; and the memory further comprises:
a matching instruction to be executed to receive a packet subsequently sent from the DHCP client terminal device, to match the user information carried in the packet with established entries, and to forward the packet using the identity of the DHCP server in the entry matching the user information.

9. An authentication server that supports a Remote Authentication Dial-In User Service (RADIUS), the authentication server comprising: a processor and a memory, wherein
the processor communicates with the memory and executes instructions stored by the memory;
the memory comprises:
an authentication instruction to be executed to authenticate a Dynamic Host Configuration Protocol (DHCP) client terminal device user under a trigger of a network device with a DHCP relay function, wherein the network device triggers an authentication executed by the authentication instruction on the DHCP client terminal device user when receiving a DHCP packet for requesting a configuration parameter sent from a DHCP client terminal device;
a designating instruction to be executed to designate a DHCP server, among a plurality of DHCP servers, for the DHCP client terminal device user when the DHCP client terminal device user passes the authentication, wherein the designating instruction further comprises:
an identifying sub-instruction to be executed to identify a privilege of the DHCP client terminal device user, search for DHCP servers, from the plurality of DHCP servers, corresponding to the identified privilege in preset corresponding relationships between user privileges and DHCP servers; and
a designating sub-instruction to be executed to designate one of the found DHCP servers for the DHCP client terminal device user; and
a sending instruction to be executed to notify the network device of an identity of the designated DHCP server, to encapsulate the identity of the designated DHCP server in an unused option of a RADIUS Request for Comments (RFC), and to forward the identity of the designated DHCP server to the network device, wherein
the network device establishes an entry for user information of the DHCP client terminal device user and the identity of the designated DHCP server to reduce resource utilization of the DHCP server.

10. The authentication server of claim 9, wherein the DHCP packet is a DHCP-DISCOVER packet and the network device further matches the user information carried in a packet with established entries when receiving the packet subsequently sent from the DHCP client terminal device, and forwards the packet using the identity of the DHCP server in the entry matching the user information.

11. The authentication server of claim 9, wherein the configuration parameter comprises: an IP address, a Domain Name System, a gateway, and a domain.

12. A system for dynamically selecting a Dynamic Host Configuration Protocol (DHCP) server for a DHCP client terminal device comprising: the DHCP client terminal device, a network device with a DHCP relay function and an authentication server that supports a Remote Authentication Dial-In User Service (RADIUS); wherein the DHCP client terminal device is to send a DHCP packet for requesting a configuration parameter to the network device and subsequently send a packet to the network device;

the network device is to trigger an authentication performed by the authentication server on a DHCP client terminal device user after receiving the DHCP packet for requesting the configuration parameter sent from the DHCP client terminal device, to receive an identity of a DHCP server, among a plurality of DHCP servers, designated by the authentication server for the DHCP client terminal device user by obtaining the identity of the DHCP server encapsulated in an option from an option of Request for Comments (RFC) of a RADIUS sent from the authentication server, and to establish an entry for user information of the DHCP client terminal device user and the identity of the designated DHCP server to reduce resource utilization of the DHCP server; and the authentication server is to authenticate the DHCP client terminal device user under a trigger of the network device, designate the DHCP server for the DHCP client terminal device user if the DHCP client terminal device user passes the authentication, notify the network device of the identity of the DHCP server, identify a privilege of the DHCP client terminal device user, search for DHCP servers, from the plurality of DHCP servers, corresponding to the identified privilege in preset corresponding relationships between user privileges and DHCP severs, and designate one of the found DHCP servers for the DHCP client terminal device user.

13. The system of claim 12, wherein the configuration parameter comprises: an IP address, a Domain Name System, a gateway, and a domain; and the network device is further to match the user information carried in the packet with established entries after receiving the packet subsequently sent from the DHCP client terminal device, and to forward the packet using the identity of the DHCP server in the entry matching the user information.

* * * * *